(12) United States Patent  
Marti et al.

(10) Patent No.: US 9,071,937 B2  
(45) Date of Patent: Jun. 30, 2015

(54) TIERED DELIVERY OF LOCATION DATA

(71) Applicant: Apple Inc., Cupertino, CA (US)

(72) Inventors: Lukas M. Marti, Santa Clara, CA (US); Robert Mayor, Half Moon Bay, CA (US); Shannon M. Ma, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 211 days.

(21) Appl. No.: 13/756,452

(22) Filed: Jan. 31, 2013

(65) Prior Publication Data

US 2014/0213298 A1 Jul. 31, 2014

(51) Int. Cl.
*H04W 24/00* (2009.01)
*H04W 4/02* (2009.01)
*G01S 5/02* (2010.01)
*H04W 64/00* (2009.01)
*H04W 4/04* (2009.01)

(52) U.S. Cl.
CPC ............. *H04W 4/025* (2013.01); *G01S 5/0252* (2013.01); *H04W 64/00* (2013.01); *G01S 5/0236* (2013.01); *H04W 4/043* (2013.01); *H04W 4/046* (2013.01)

(58) Field of Classification Search
None
See application file for complete search history.

(56) References Cited

U.S. PATENT DOCUMENTS

2008/0176583 A1* 7/2008 Brachet et al. ............. 455/456.3
2014/0094199 A1* 4/2014 Palanki et al. ............. 455/456.5

OTHER PUBLICATIONS

Chen Feng et al: "Compressive Sensing Based Positioning Using RSS of WLAN Access Points", INFOCOM, 2010 Proceedings IEEE, IEEE, Piscataway, NJ, USA, Mar. 14, 2010, pp. 1-9, XP031674868, ISBN: 978-1-4244-5836-3.
Chen Feng et al: "Received-Signal-Strength-Based Indoor Positioning Using Compressive Sensing", IEEE Transactions on Mobile Computing, IEEE Service Center, Los Alamitos, CA, vol. 11, No. 12, Dec. 1, 2012, pp. 1983-1993, XP011470186, ISSN: 1536-1233, DOI: 10.1109/TMC.2011.216.
International Search Report and Written Opinion of the International Searching Authority, PCT Application Serial No. PCT/US2014/011921, Jul. 15, 2014, 16 pp.

* cited by examiner

*Primary Examiner* — Erika A Washington
(74) *Attorney, Agent, or Firm* — Fish & Richardson P.C.

(57) ABSTRACT

Techniques of delivering location data are described. A location server can receive, from a mobile device, a request for location data for determining a location of the mobile device at a venue. The request can include an estimated location of the mobile device. The location server can provide to the mobile device coarse location data for each venue that is located within a threshold distance to the estimated location of the mobile device. The coarse location data can include a list of coarse tiles at each venue, and parameters of a probability distribution function for determining in which tile of the venue the mobile device is located based on signals detected by the mobile device. The location server can the provide location fingerprint data associated with the tile and neighboring tiles to the mobile device. The mobile can use the location fingerprint data to determine a more detailed location.

21 Claims, 10 Drawing Sheets

TIERED DELIVERY OF LOCATION DATA

TECHNICAL FIELD

This disclosure relates generally to location determination.

BACKGROUND

Some mobile devices have features for determining a geographic location. For example, a mobile device can include a receiver for receiving signals from a global satellite system (e.g., global positioning system or GPS). The mobile device can determine a geographic location, including latitude and longitude, using the received GPS signals. In many places, GPS signals can be non-existent, weak, or subject to interference, such that it is not possible to accurately determine a location using the GPS functions of the mobile device. For example, a conventional mobile device often fails to determine a location based on GPS signals when the device is inside a building or tunnel.

SUMMARY

Techniques of delivering location data are described. A location server can receive, from a mobile device, a request for location data that can be used to determine a location of the mobile device at a venue. The request can include an estimated location of the mobile device. The location server can provide to the mobile device coarse location data for each venue that is located within a threshold distance to the estimated location of the mobile device. The coarse location data can include a list of coarse tiles at each venue, and parameters of a probability distribution function for determining in which tile of the venue the mobile device is located based on signals detected by the mobile device. The location server can the provide location fingerprint data associated with the tile and neighboring tiles to the mobile device. The mobile can use the location fingerprint data to determine a more detailed location.

The features described in this specification can be implemented to achieve the following advantages. Compared to a conventional mobile device having GPS functions and conventional dead reckoning functions, a mobile device utilizing features described in this specification can provide a location estimate when GPS signals and dead reckoning are unavailable. Accordingly, for example, a user entering an airport building from an airplane can know the user's location in the airport building using the mobile device.

Compared to a conventional system in which a server provides location data to a mobile device, communications between the mobile device and a location server implementing the features described in this specification can be more efficient. The location server can provide the location data to a mobile device on an as-needed basis. The location server can transmit the location data in a tiered manner, where the location server provides data that are more detailed only when the location server determines that the mobile device needs that more detailed data, e.g., when the mobile device is located at a given coarse location. Accordingly, the location server can avoid sending all detailed data upfront.

The details of one or more implementations of tiered delivery of location data are set forth in the accompanying drawings and the description below. Other features, aspects, and advantages of tiered delivery of location data will become apparent from the description, the drawings, and the claims.

BRIEF DESCRIPTION OF THE DRAWINGS

Like reference symbols in the various drawings indicate like elements.

DETAILED DESCRIPTION

Exemplary Tiers of Delivery

Figure 1:
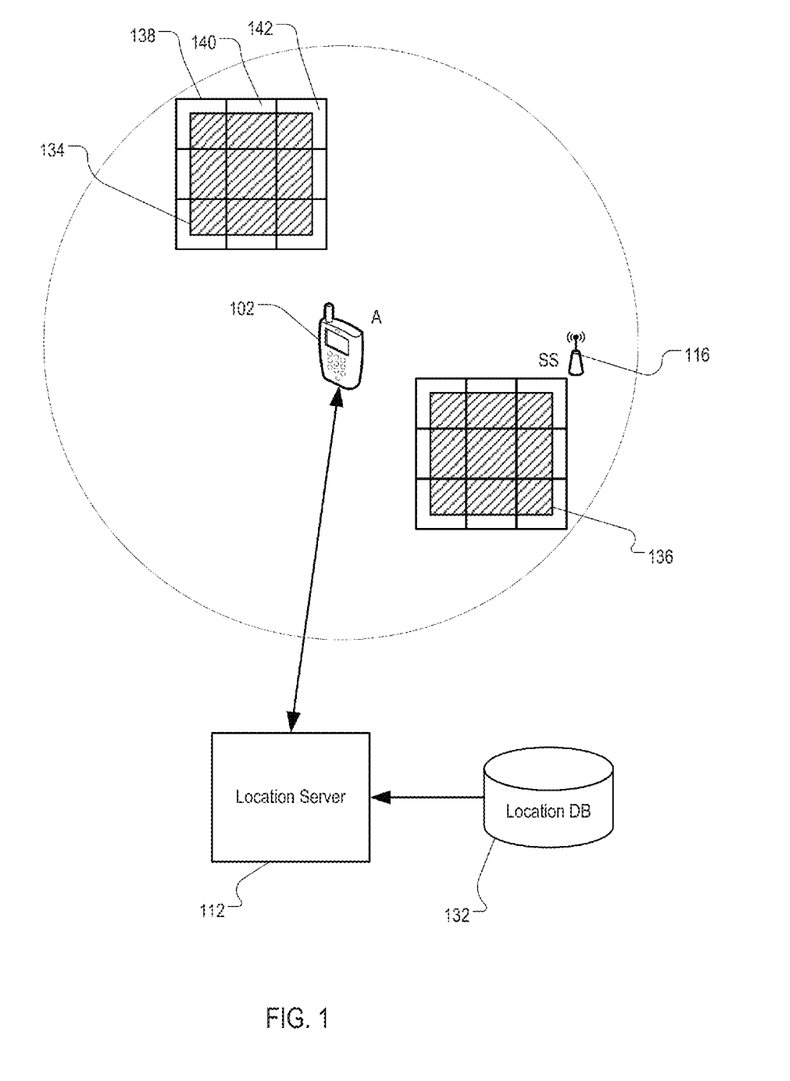
FIG. 1 is a diagram illustrating an exemplary first tier of tiered delivery of location data.

FIG. 1 is a diagram illustrating an exemplary first tier of tiered delivery of location data. Mobile device 102 can request location data from location server 112. The location data can include data that mobile device 102 can use to determine a location of mobile device 102 at a venue based on measurements of signals received from one or more signal sources, e.g., signal source 116. The request can include or be accompanied by an estimated location, e.g., location A, of mobile device 102. Mobile device 102 can determine location A based on GPS signals or triangulation using cellular information.

Location server 112 can include one or more computers. Upon receiving the request and location A of mobile device 102, location server 112 can query location database 132 and determine one or more venues, e.g., venue 134 and venue 136, that are located within a threshold distance from location A. The threshold distance can be a distance pre-specified by location server 112, a distance determined based on a characteristic of mobile device 102, or a distance provided by mobile device 102.

Each of venue 134 and venue 136 can be a space accessible by a pedestrian. Each of venue 134 and venue 136 can include one or more constraints limiting the pedestrian's movement in the space. These constraints can include, for example, map constraints (e.g., walls, railings, or cubicle separators), pathway constraints (e.g., a pedestrian walking on a pathway defined by road signs tends to follow the pathway), or pedestrian motion constraints (e.g., a pedestrian cannot move faster than X miles per hour, or move vertically when not in a stairway or elevator). Each of venue 134 and venue 136 can be a physical structure. The physical structure can be closed (e.g., an office building) or open (e.g., an open stadium). The space can be indoor space inside of the physical structure, or space inside of a bounding space of the physical structure if the physical structure is open. Each of venue 134 and venue 136 can be mobile (e.g., an airplane, a cruise ship, or a mobile oil platform).

Location server 112 can provide first tier location data to mobile device 102 as a response to the request. The first tier location data can include coarse location data of each of venue 134 and venue 136 to mobile device 102. The coarse location data can include an identifier for the corresponding venue, and a two dimensional or three dimensional bounding box corresponding to space the corresponding venue occupies on Earth. For example, the coarse location data of venue 134 can include bounding box 138 that encloses venue 134. Mobile device 102 can use the bounding boxes to determine whether to request second tier information from location server 112.

In addition, the coarse location data can include parameters of a probability distribution function. Mobile device 102 can apply the probability distribution function to detected signals (e.g., signals from signal source 116) to determine a likelihood that mobile device 102 is located at various locations at venue 134 or venue 136. The location can be a coarse estimate of a location of mobile device 102 relative to a venue.

The coarse location data can include a list of tiles, e.g., tile 140 and tile 142, within the venue. Each of tile 140 and tile 142 can include information of a portion of venue 134. Each of tile 140 and tile 142 can include a two dimensional or three dimensional bounding box enclosing the portion of venue 134. Each of tile 140 and tile 142 can be associated with a tile identifier. Mobile device 102 can map the coarse location of mobile device 102 to one or more of the tiles, when the coarse location is inside the one or more tiles or includes the one or more tiles. When requesting second tier location data, mobile device 102 can submit the identifiers of the one or more tiles to location server 112, and request second tier location data associated with the one or more tiles and neighboring tiles. If no second tier location data are available, mobile device 102 can designate the coarse location as the location of mobile device 102. If second tier location data are available, mobile device 102 can determine a detailed location of mobile device 102 relative to the corresponding venue, and designate the detailed location as the location of mobile device 102. Compared to a coarse location estimate, a detailed location estimate can have smaller error margin, higher confidence, or both. For example, a coarse location in a building can correspond to several rooms and several floors, whereas a detailed location in the building can correspond to a particular area of a particular room on one floor.

Figure 2:
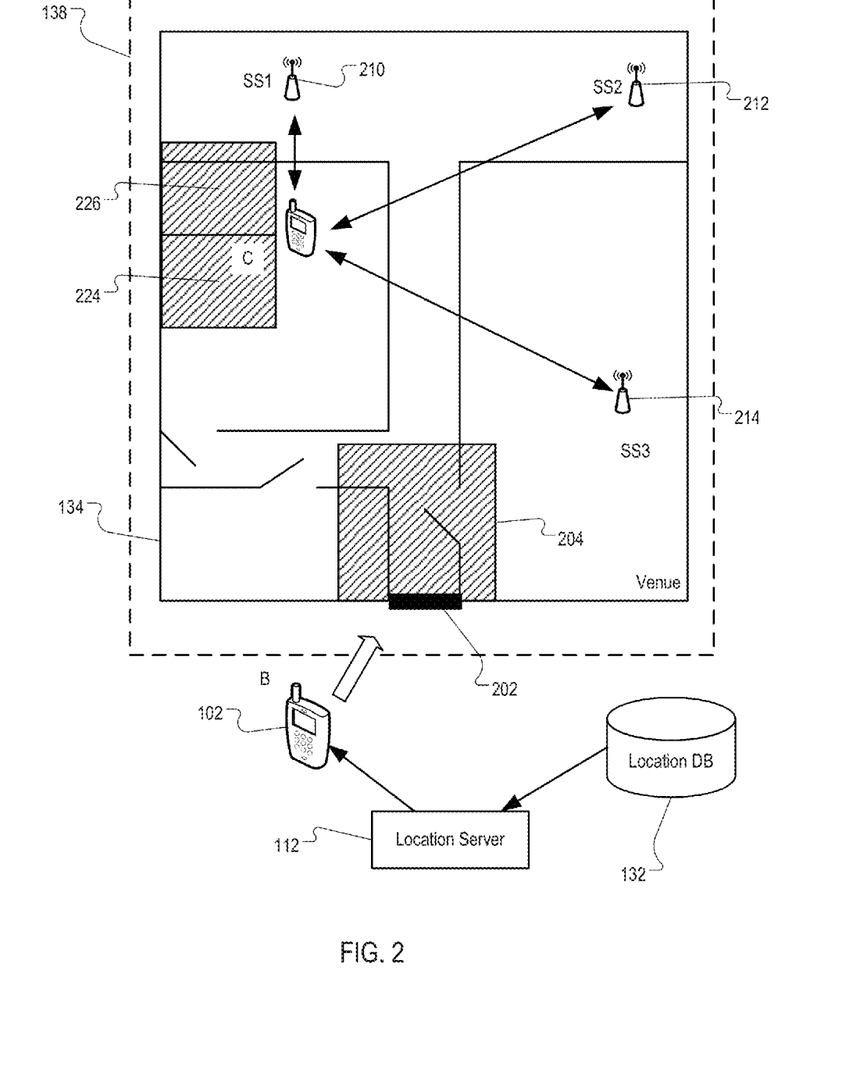
FIG. 2 is a diagram illustrating an exemplary second tier of tiered delivery of location data.

FIG. 2 is a diagram illustrating an exemplary second tier of tiered delivery of location data. Mobile device 102 can be located at location B. Mobile device 102 can determine that a contextual condition for requesting second tier location data has been satisfied. The contextual condition can trigger mobile device 102 to request detailed location data from location server 112. The contextual condition can include, for example, whether mobile device 102 is heading to entrance 202 of venue 134, whether mobile device 102 is moving at a pedestrian speed (e.g., an estimated speed of human walking), or whether mobile device 102 has entered bounding box 138 of venue 134. Mobile device 102 can send a request to location server 112 for second tier location data. The request can include, or be associated with, an indication that the contextual condition has been satisfied, and identifier of tile 204. Tile 204 can be a tile of venue 134 that encloses entrance 202.

Upon receiving the request, location server 112 can determine location fingerprint data associated with tile 204. Location fingerprint data associated with tile 204 can be stored in location database 132. Location server 112 can provide the location fingerprint data to mobile device as the detailed location data. Mobile device 102 can use the location fingerprint data to determine a detailed location of mobile device 102 at venue 134.

In another scenario, mobile device 102 can be located at location C at venue 134. Based on the first tier location data, mobile device 102 can determine a coarse estimated location of mobile device 102 based on signals from signal source 210, signal source 212, and signal source 214. Signal sources 210, 212, and 214 can include radio frequency (RF) signal transmitters. The first tier location data can include parameters of a probability density function. The parameters can include locations of signal source 210, signal source 212, and signal source 214. Based on measurements of signals from signal source 210, signal source 212, and signal source 214, mobile device 102 can determine a most likely location of mobile device 102 using the probability distribution function. Mobile device 102 can designate the most likely location as the coarse location. Mobile device 102 can identify tile 224 that encloses the coarse location.

Mobile device 102 can submit a request for second tier location data to location server 112. The request can include or be associated with an identifier of tile 224, and a probability that mobile device 102 is location at location C, as determined by the probability density function. Location server 112 can identify location fingerprint data associated with tile 224 from location database 132. In addition, location server 112 can determine that the probability is lower than a threshold probability. Accordingly, location server 112 can identify location fingerprint data associated with tile 226, which neighbors tile 224, from location server 112. Location server 112 can provide the location fingerprint data for tiles 224 and 226 as second tier location data to mobile device 102.

Exemplary Location Data

Figure 3:
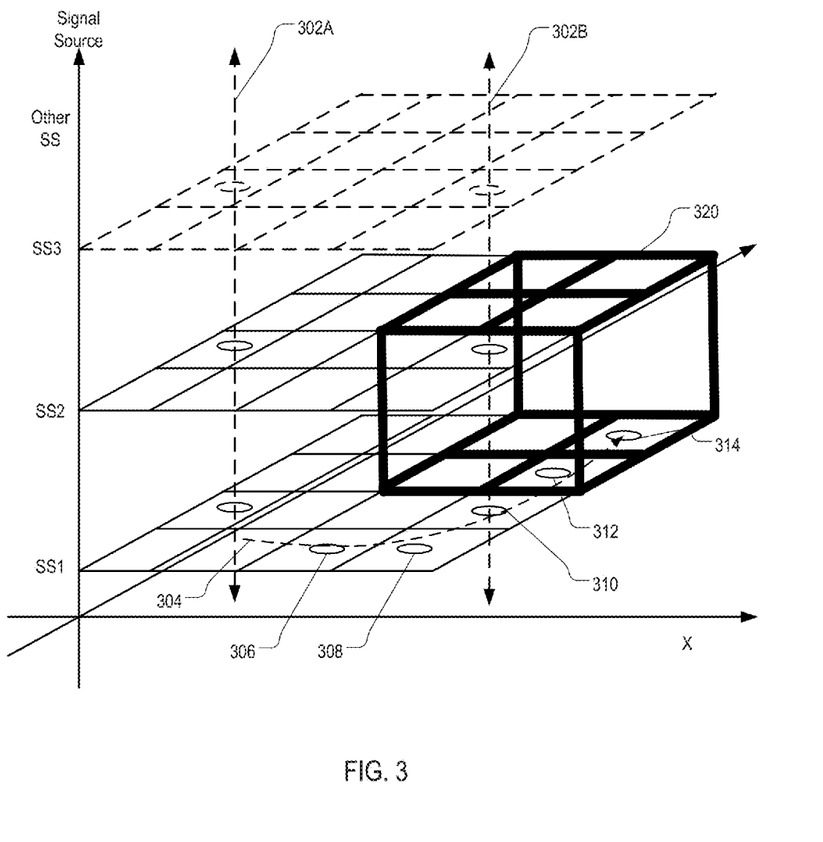
FIG. 3 is a diagram illustrating an exemplary logical structure of location fingerprint data delivered from a location server to a mobile device.

FIG. 3 illustrates an exemplary logical structure of location fingerprint data. The location fingerprint data can be generated by location server 112, and stored in location database 132 of FIG. 1. The location fingerprint data can be the first tier location data. The exemplary logical structure illustrated in FIG. 3 can correspond to a portion of the location fingerprint database, e.g., the portion that corresponds to venue 134.

Location fingerprint data can include, for each location among multiple locations in a venue (e.g., venue 134 of FIG. 1), a measurement vector, e.g., measurement vector 302A or 302B. Each of measurement vectors 302A and 302B can include expected measurements of signals from one or more signal sources at the location, variance of the expected measurements at the location, and weights of the expected measurements at the location. The expected measurements can include measurements that a mobile device, if located at the corresponding location, is expected to take. The variance can include a range of values of the expected measurements, and a probability that the measurements have each value. The weights can indicate how much weight the mobile device is going to apply to the corresponding expected measurements in statistical classification. The weight of a given signal source can correspond to a probability that a mobile device can detect the signal from the signal source.

The expected measurements can correspond to more than one type of signal sources. For example, location fingerprint data can include at least one of: wireless access point fingerprint data; radio frequency identification (RFID) fingerprint data; near field communication (NFC) fingerprint data; Bluetooth™ fingerprint data; magnetic field fingerprint data; cellular fingerprint data; or computer vision fingerprint data. The various fingerprint data can be aggregated to form the location fingerprint data for a given venue or a given location at the venue. The various fingerprint data can include, for example, a received signal strength indication (RSSI), a round trip time, a magnetic field strength and direction.

Location fingerprint data can be stored as multi-dimensional data in association with venue 134. Some of the dimensions of the multi-dimensional data can be space dimensions. The space dimensions can include X (e.g., latitude), Y (e.g., longitude), and Z (e.g., altitude, not shown). The space dimension can be continuous, expressed in a function, or discrete, where the space dimension can include locations distributed as the venue. The distribution can be even and uniform, or concentrated around areas where good measurements (e.g., strong signals or strong contrast between a first signal and a second signal) can be obtained.

At least one dimension of the multi-dimensional data can be a signal source dimension. Location fingerprint data can include multiple measurement vectors, each measurement vector corresponding to a location in the venue. Measurement vector 302A can correspond to a location represented by (X1, Y1, Z1), and have one or more values of each signal source at location (X1, Y1, Z1). Likewise, measurement vector 302B can correspond to a location represented by (X2, Y2, Z2), and have one or more values of each signal source at location (X2, Y2, Z2). The values can include one or more of an expected value of an environment variable (e.g., an expected RSSI), a variance of the expected value, or the weight. Location server 112 can determine the expected measurement and variance based on measurements and variance of the measurements received from a sampling device. The sampling device can be a mobile device configured to detect signals from signal sources at multiple locations in the venue when the mobile device moves in the venue.

In some implementations, the space dimension can be normalized. Each measurement received from a sampling device can correspond to a sampling point. For example, a surveyor can carry the sampling device and follow path 304 to survey a venue. Location server 112 can determine a location grid, and normalize path 304 to locations 306, 308 310, 312, and 314 according to distribution of locations 306, 308 310, 312, and 314. More details on obtaining measurement using survey by sampling device will be described below in reference to FIG. 4.

The entire search space for venue 134 can include all the signal sources (e.g., SS1, SS2, and SS3) and all sample points, as well as location in venue 134 that are not sampled where the expected measurements are determined by interpolation or extrapolation. The search space can be reduced when a coarse location is known. Reduced search space 320 can include a portion of the signal sources, e.g., SS1 and SS2, and a portion of all sample locations. Reduced search space 320 can include the portion of the signal sources and portion of sample locations associated with one or more tiles (e.g., tile 204 of FIG. 2). A mobile device can determine a location by performing statistical classification of signal measurements in reduced search space 320.

Figure 4:
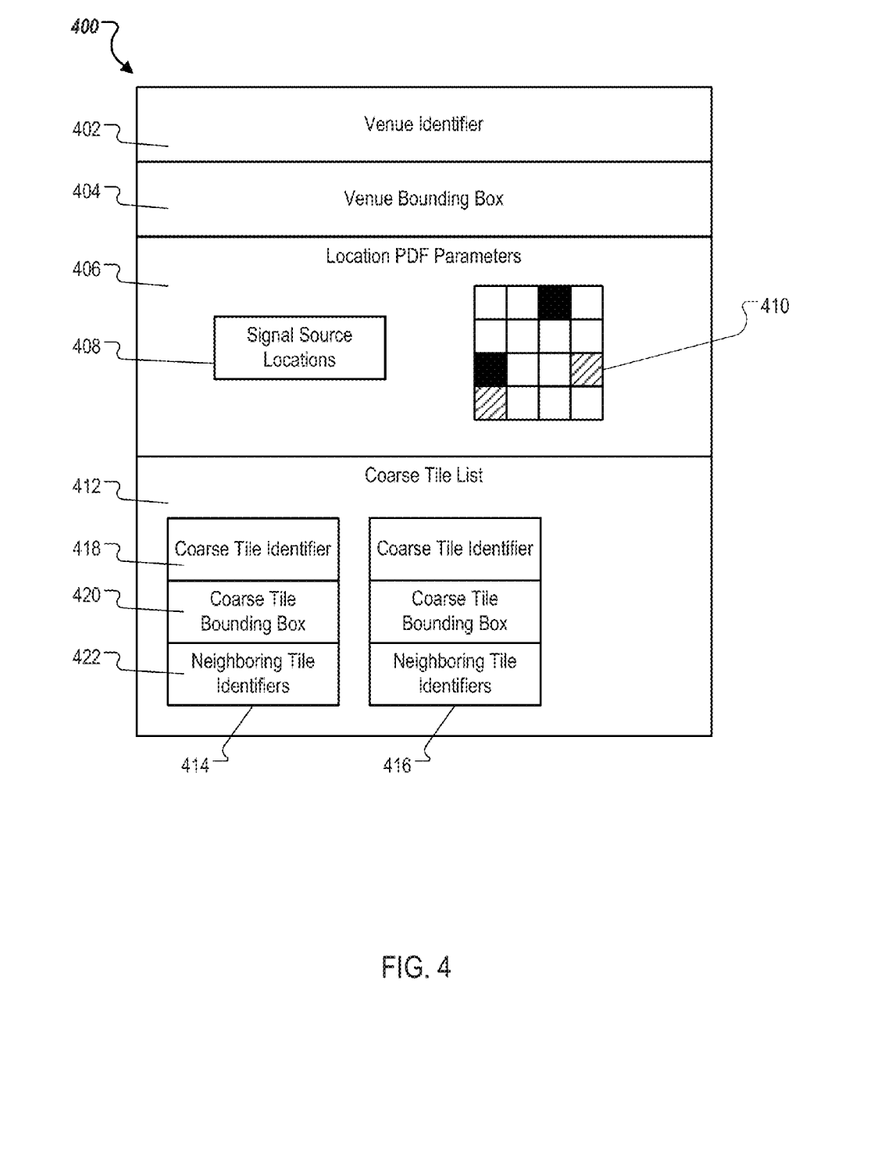
FIG. 4 is a diagram illustrating an exemplary logical structure of coarse location data delivered from a location server to a mobile device.

FIG. 4 is a diagram illustrating an exemplary logical structure of coarse location data 400 delivered from location server 112 to mobile device 102. Coarse location data 400 can be second tier location data. Coarse location data 400 can be associated with each venue, e.g., venue 134. Coarse location data 400 can include venue identifier 402 identifying the venue.

Coarse location data 400 can include venue bounding box 404. Venue bounding box 404 can be a three dimensional box. In various implementations, venue bounding box 404 can be defined by multiple vertices, by a given vertex or center and length, width, and depth, or by a center and a radius. For example, venue bounding box 404 can include latitude, longitude, and altitude coordinates of each of eight vertices of a box enclosing a building. Venue bounding box 404 can be larger than the building venue bounding box 404 encloses, e.g., when the building has a concave shape.

Coarse location data 400 can include location probability density function (PDF) parameters 406. Location PDF parameters 406 can include signal source locations 408. Signal source locations 408 can include estimated or actual locations (e.g., latitude, longitude, and altitude coordinates) of signal sources the signals from which are detectable at the corresponding venue. Location PDF parameters 406 can include location probability histogram 410 for each of the signal sources. Location probability histogram 410 can include a probability distribution in a three-dimensional space. The probability distribution for a given signal source can indicate a probability that a mobile device is located at location (X, Y, Z) when the mobile device can detect a signal of the corresponding signal source. Location probability histogram 410, as illustrated in FIG. 4, is a top view of an exemplary two-dimensional histogram. A solid box in location probability histogram 410 indicates a highest likelihood that the mobile device is located in an area corresponding to the box; a shaded box in location probability histogram 410 indicated a lower likelihood; a blank box indicates a lowest likelihood. Mobile device 102 can use location probability histogram 410 to estimate a coarse location based on signals from multiple signal sources.

Coarse location data 400 can include coarse tile list 412. Coarse tile list 412 can include tile 414 and tile 416. Tile 414 and tile 416 can each correspond to a portion of the venue associated with coarse location data 400. The portions of venue represented by tile 414 and tile 416 may overlap. Tile 414 can include coarse tile identifier 418 identifying tile 414. Tile 414 can include coarse tile bounding box 420. Coarse tile bounding box 420 can have a same structure as venue bounding box 404. Coarse tile bounding box 420 can be fully or partially enclosed by venue bounding box 404. In some implementations, tile 414 can include neighboring tile identifiers 422.

Exemplary Device Components and Server Components

Figure 5:
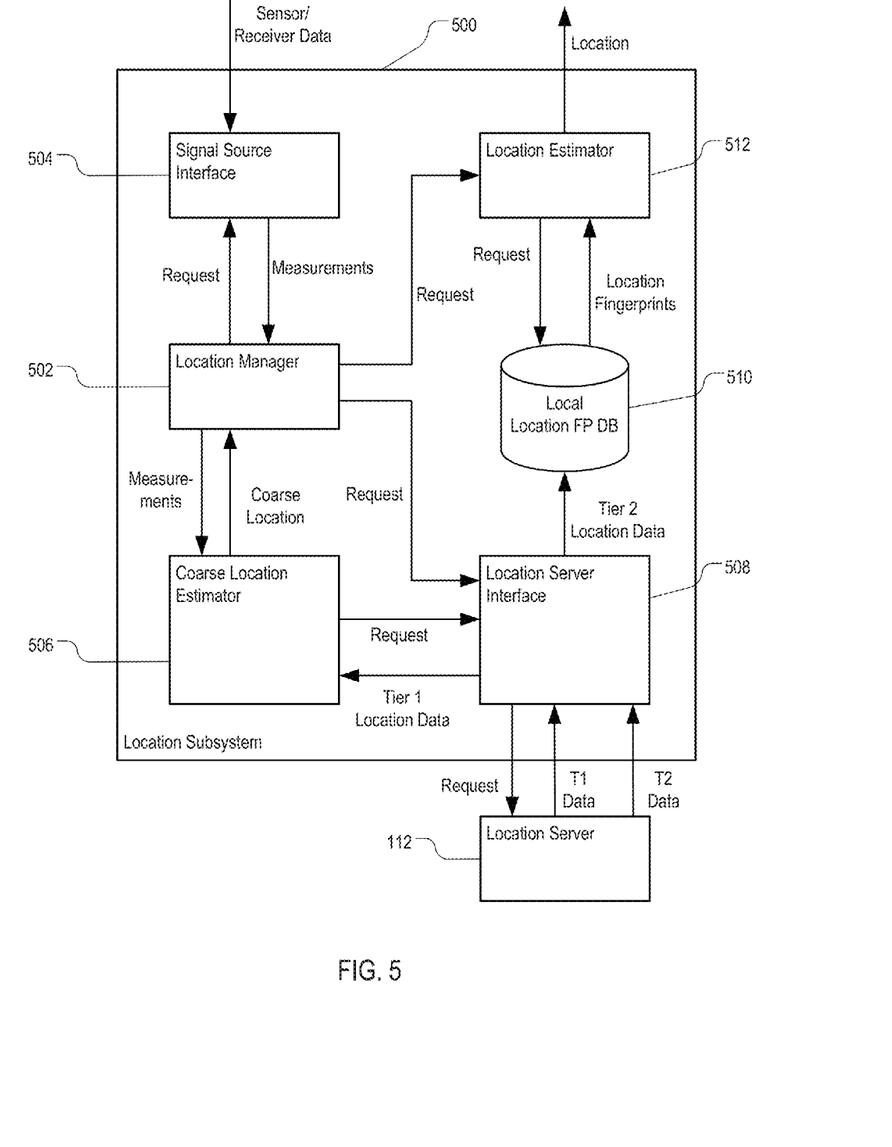
FIG. 5 is a block diagram illustrating components of an exemplary location subsystem of a mobile device.

FIG. 5 is a block diagram illustrating components of exemplary location subsystem 500 of mobile device 102. Location subsystem 500 can include hardware or software components for reducing a search space in location determination and determining an estimated location of mobile device 102 using the reduced search space.

Location subsystem 500 can include location manager 502. Location manager 502 is a component of location subsystem 500 configured to manage location determination functions. When signals from a global satellite system (e.g., GPS) are available, location manager 502 can determine a location of mobile device 102 using the signals from the global satellite system. When signals from a global satellite system are unavailable, location manager 502 can request signal source interface 504 to provide one or more measurements of signals received from signal sources by one or more sensors or receivers of mobile device 102.

Signal source interface 504 can be a component of location subsystem 500 configured to interface with the one or more sensors or receivers of mobile device 102 and provide measurements of the signals and identifiers of the signal sources to location manager 502. The measurements can include, for example, an RSSI or a round-trip time when the signal sources are wireless access points, a temperature when the signal sources are heat sources, a sound pressure level when the signal sources are sound sources, a light intensity or spectrum when the signal sources are light sources.

Upon receiving the measurements from signal source interface 504, location manager 502 can provide the received measurements and identifiers to coarse location estimator 506. Coarse location estimator 506 is a component of location subsystem 500 configured to determine a coarse location of mobile device 102. Coarse location estimator 506 can submit the identifiers of the signal sources to location server interface 508 in a request for coarse location data. In some implementations, coarse location estimator 506 can submit a location determined by a GPS subsystem to location server interface 508 in the request for coarse location data. The coarse location data can be first tier location data.

Location server interface 508 is a component of location subsystem 500 configured to send location data requests to location server 112 and receive location data from location server 112. Upon receiving the request for coarse location data, location server interface 508 can submit the request to location server 112 and receive coarse location data in response. The request can include identifiers of signal sources or an estimated location of mobile device 102. Location server interface 508 can submit the coarse location data received in response to the request to coarse location estimator 506.

Upon receiving the coarse location data, coarse location estimator 506 can determine a coarse location of mobile device 102 based on the measurements received from location manager 502 and the coarse location data. The coarse location can be associated with an uncertainty value indicating an error margin of the coarse location. Coarse location estimator 506 can submit the coarse location and the associated uncertainty value to location manager 502. Location manager 502 can determine a tile that corresponds to the coarse location. Location manager 502 can submit an identifier of the tile to location server interface 508 in a request for second tier location data, e.g., location fingerprint data. Location server interface 508 can submit the request to location server 112 as a second request. Location server 112 can retrieve the location fingerprint data to the tile and neighboring tiles, and provide the location fingerprint data to location server interface 508. Location server interface 508 can store the received location fingerprint data in local location fingerprint database 510. Local location fingerprint database 510 can be a component of location subsystem 500 configured to store location fingerprint data on mobile device 102.

Location manager 502 can request location estimator 512 to determine an estimated location of mobile device 102. The request can include the uncertainty value as determined by coarse location estimator 506 and measurements provided by signal source interface 504. Location estimator 512 is a component of location subsystem configured to determine the estimated location by performing statistical classification of the measurement using location fingerprint data. Location estimator 512 can request the location fingerprint data from local location fingerprint database 510, and perform the statistical classification of the measurements based on the uncertainty value. Location estimator 512 can provide the estimated location resulting from the statistical classification as an output of location subsystem 500. Mobile device 102 can provide the output for display on a display device, or use the output to drive location based application programs or system services.

Figure 6:
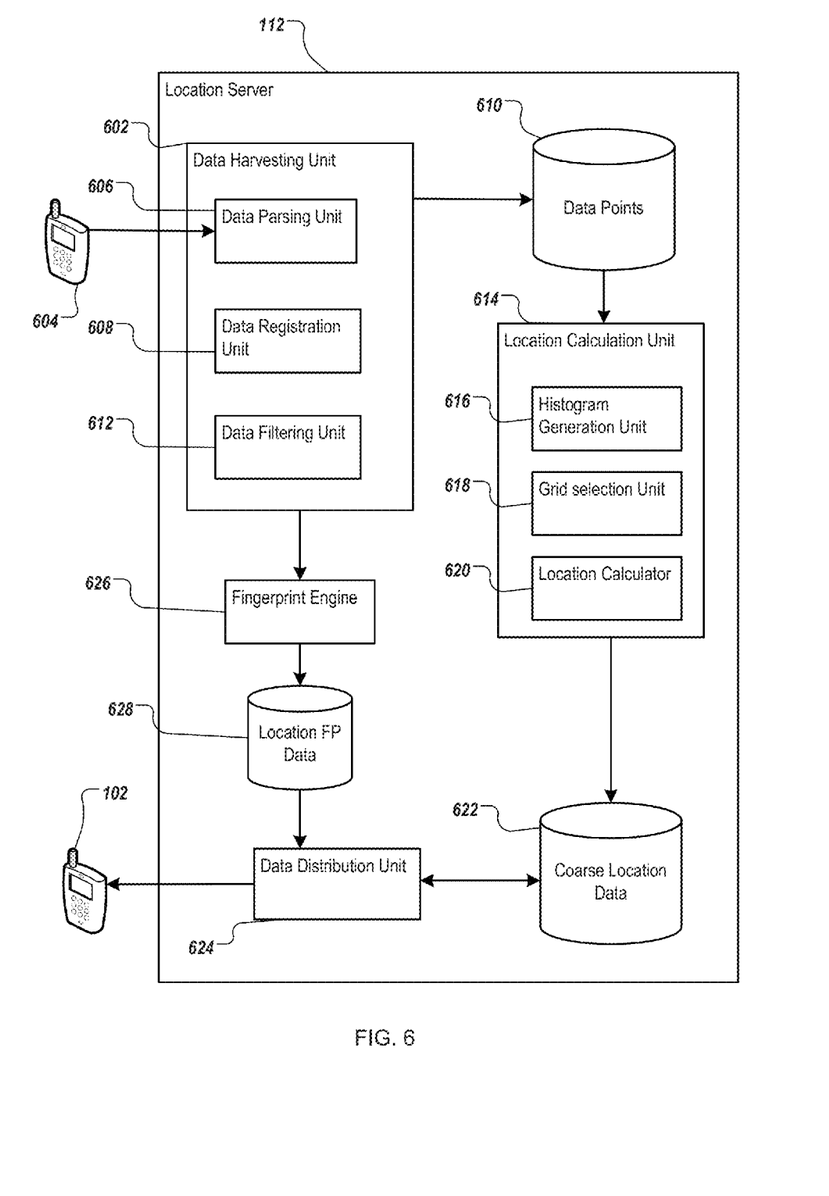
FIG. 6 is a block diagram illustrating components of an exemplary location server.

FIG. 6 is a block diagram illustrating components of exemplary location server 112 configured to generate coarse location data and location fingerprint data, and to provide the coarse location data and location fingerprint data to a mobile device.

Location server 112 can include data harvesting unit 602. Data harvesting unit 602 is a component of location server 112 that is programmed to receive and process survey data from sampling device 604. Sampling device 604 can be a mobile device configured to record measurements of signal sources at multiple locations at a (e.g., venue 134), and submit the recorded measurements to location server 112 as survey data. Sampling device 604 can be mobile device 102 or another mobile device.

Data harvesting unit 602 can include data parsing unit 606. Data parsing unit 606 is a component of data harvesting unit 602 that is configured to receive the survey data from sampling device 604, parse data fields of the survey data, and generate structured data, e.g., name-value pairs that match identifier of a signal source to a measurement of signals from that signal source and venue-name pairs that match signal sources to a venue. The identifier can be a media access control (MAC) address or a service set identifier (SSID) of a signal source.

Data harvesting unit 602 can include data registration unit 608. Data registration unit 608 is a component of data harvesting unit 602 that is configured to receive parsed data (e.g., the name-value pairs) generated by data parsing unit 606, and send at least a portion of the parsed data to data point data store 610 for storage. Data point data store 610 can include a database (e.g., a relational database, an object-oriented database, or a flat file) that is configured to store location information in association with signal source identifiers.

Data harvesting unit 602 can include data filtering unit 612. Data filtering unit 612 is a component of data harvesting unit 602 that is configured to identify stale data from data point data store 610, and remove the stale data from data point data store 610. The stale data can include measurement of signals from signal sources that are determined to have moved.

Location server 112 can include location calculation unit 614. Location calculation unit 614 is a component of location server 112 that is configured to generate one or more estimated locations based on data points stored in data point data store 610 using a probability density function. Location calculation unit 614 can include histogram generation unit 616. Histogram generation unit 616 is a component of location calculation unit 614 that is configured to generate a histogram based on data points from data point data store 610. The histogram can indicate a probability of a signal source being located at each of multiple locations. Histogram generation unit 616 can generate a histogram for each signal source.

Location calculation unit 614 can include grid selection unit 618. Grid selection unit 618 is a component of location calculation unit 614 that is configured to select one or more locations ("bins") from the histogram generated by histogram generation unit 616 using a probability density function. The selection operations can include applying a multi-modal probability function.

Location calculation unit 614 can include location calculator 620. Location calculator 620 is a component of location calculation unit 614 that is configured to calculate a location of each signal source based on the selected bins, and to calculate an uncertainty of the calculated location. The calculated location can include location coordinates including a latitude coordinate, a longitude coordinate, and an altitude coordinate. The uncertainty can indicate an estimated accuracy of the calculated location.

Location calculator 620 can be configured to calculate a reach of each signal source from information associated with data points stored in data point data store 610. The reach of a signal source can indicate a maximum distance from which the signal source can be expected to be observable by a mobile device. Location calculator 620 can calculate the reach using locations in the harvested data and the calculated location.

Location calculation unit 614 can generate output including the location coordinates determined by location calculator 620. The location coordinates can be associated with an identifier of the signal source, an uncertainty, and a reach of the signal source. Location server 112 can designate the output as coarse location data 622.

Location server 112 can include data distribution unit 624. Data distribution unit 624 is a component of location server 112 that is configured to retrieve coarse location data 622, and send the coarse location data 622 to mobile device 102 as first tier location data. Mobile device 102 can use the coarse location data to determine a coarse location of mobile device 102 using operations that are the same as the operations performed by location calculation unit 614, where the estimated locations of signal sources are changed to an estimated location of mobile device 102.

Location server 112 can include fingerprint engine 626. Fingerprint engine 626 can generate location fingerprint data 628 using survey data. To generate location fingerprint data 628 using survey data, fingerprint engine 626 can receive the survey data, and generate the location fingerprint data based on the received survey data using interpolation for determining predicted measurements at points not sampled by sampling device 604. In some implementations, fingerprint engine 626 can generate location fingerprint data 628 using predication. Predication can include extrapolation using truth data on the signal sources. The truth data can include known locations of the signal sources relative to a venue. Data distribution unit 624 can retrieve location fingerprint data 628, and, upon request, send location fingerprint data 628 to mobile device 102 as second tier location data.

Exemplary Procedures

Figure 7:
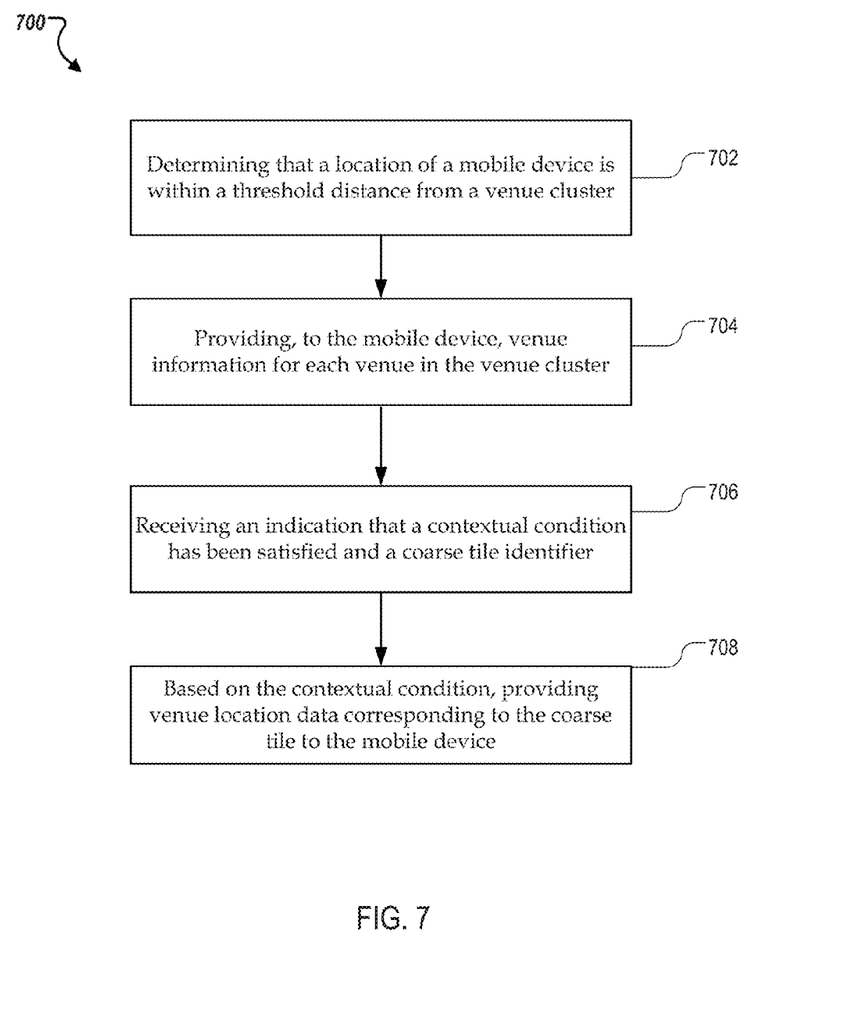
FIG. 7 is a flowchart of an exemplary procedure of tiered delivery of location data.

FIG. 7 is a flowchart of exemplary procedure 700 of tiered delivery of location data. Procedure 700 can be performed by location server 112. Location server 112 can receive a request from a mobile device, e.g., mobile device 102, a request for location data. The request can include or be associated with a location of the mobile device.

Location server 112 can determine (702) that the location of the mobile device is within a threshold distance from a venue cluster. The venue cluster can include one or more venues (e.g., venues 134 and 136). Each venue can include a space accessible by a pedestrian and one or more constraints of movement of the pedestrian in the space. The threshold distance can be defined by a number of kilometers.

Location server 112 can provide (704), to the mobile device, coarse location data for each venue in the venue cluster. The coarse location data can include a group of one or more coarse tiles of the corresponding venue. Each coarse tile can include a coarse tile identifier and a tile bounding box. The tile bounding box can represent space occupied by the corresponding coarse tile at the venue. The coarse location data can include an identifier of the corresponding venue and a venue bounding box of the corresponding venue. The venue bounding box can represent space occupied by the venue. The coarse location data can include parameters of a probability distribution function for determining a location of the mobile device at the venue based on measurements of signals from one or more signal sources detectable at the venue. Each of the one or more signal sources can includes an RF signal transmitter. In some implementations, the venue bounding box and each coarse tile bounding box is a three-dimensional box.

Location server 112 can receive (706), from the mobile device, an indication that a contextual condition for downloading location data of finer granularity, e.g., location fingerprint data, has been satisfied. The contextual condition can include whether a movement velocity of the mobile device satisfies a pedestrian walking speed threshold (e.g., Y kilometers per hour). Alternatively or additionally, the contextual condition can include whether an estimated location of the mobile device is in the venue bounding box.

In addition, location server 112 can receive, from the mobile device, a coarse tile identifier. The coarse tile identifier can be determined, by the mobile device, from the one or more coarse tile identifiers based on a probability that the mobile device is located in the tile bounding box of the corresponding coarse tile.

Based on the contextual information, location server 112 can provide (708) detailed location data corresponding to the coarse tile to the mobile device for determining a location of the mobile device in at least one of the one or more venues in the venue cluster. The detailed location data can include location fingerprints of the corresponding venue. The location fingerprints of a venue can include expected measurements of signals at multiple locations of the venue and variance of the expected measurements. The mobile device can use the location fingerprint data to determine a venue location of the mobile device at the corresponding venue. The venue location can be a location relative to the venue.

In some implementations, location server 112 can determine based on the location of the mobile device, that the mobile device will enter a venue (e.g., a subway station) in which data communications are subject to interference. Location server 112 can provide detailed location data corresponding to the venue to the mobile device before the mobile device enters the venue.

Exemplary System Architecture

Figure 8:
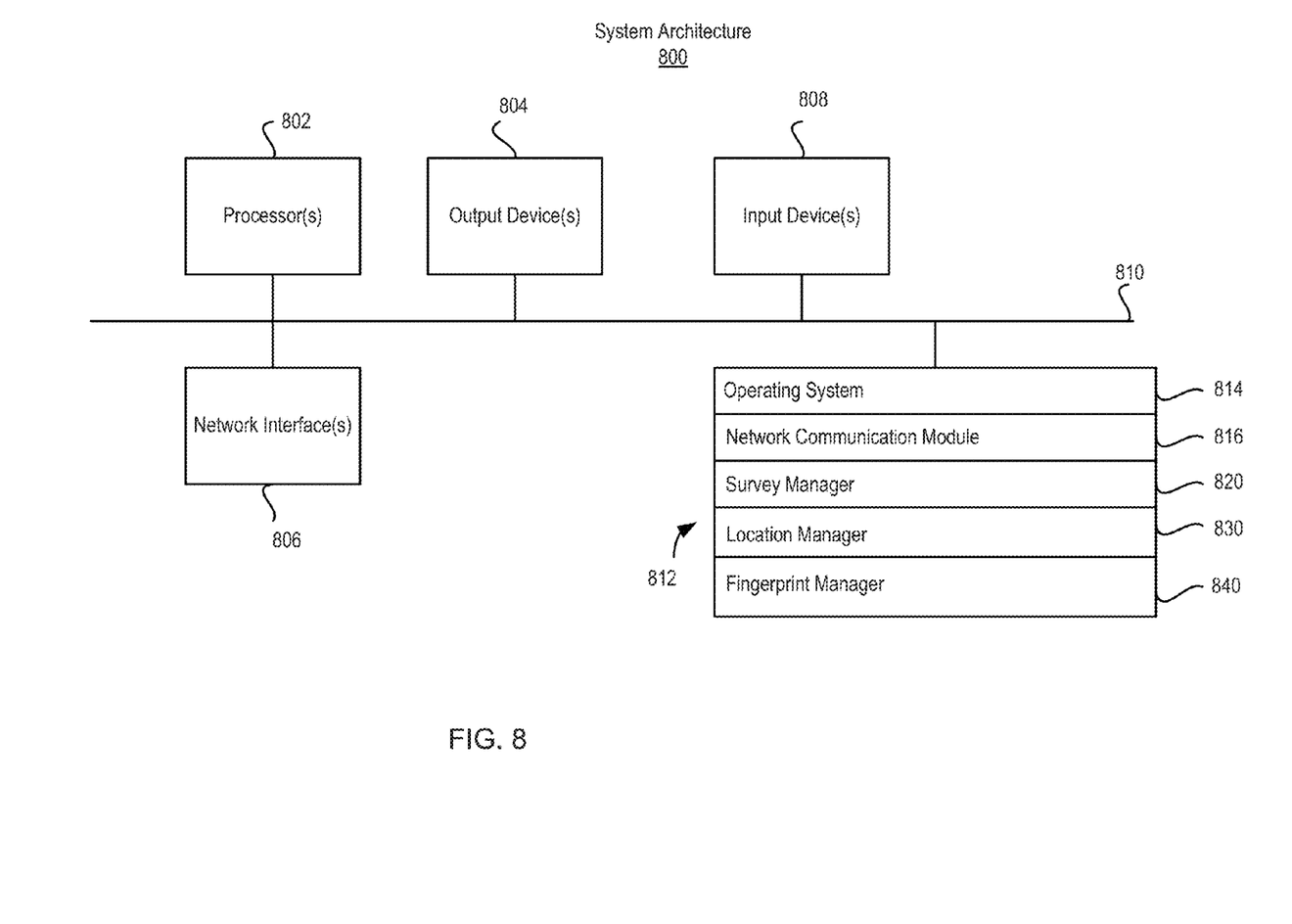
FIG. 8 is a block diagram of an exemplary system architecture for implementing the features and operations of FIGS. 1-7.

FIG. 8 is a block diagram of an exemplary system architecture for implementing the features and operations of FIGS. 1-7. Other architectures are possible, including architectures with more or fewer components. In some implementations, architecture 800 includes one or more processors 802 (e.g., dual-core Intel® Xeon® Processors), one or more output devices 804 (e.g., LCD), one or more network interfaces 806, one or more input devices 808 (e.g., mouse, keyboard, touch-sensitive display) and one or more computer-readable mediums 812 (e.g., RAM, ROM, SDRAM, hard disk, optical disk, flash memory, etc.). These components can exchange communications and data over one or more communication channels 810 (e.g., buses), which can utilize various hardware and software for facilitating the transfer of data and control signals between components.

The term "computer-readable medium" refers to any medium that participates in providing instructions to processor 802 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 812 can further include operating system 814 (e.g., Mac OS® server, Windows Server®), network communication module 816, survey manager 820, location manager 830, and fingerprint manager 840. Survey manager 820 can include instructions for causing processor 802 to perform functions of data harvesting unit 602 (of FIG. 6), as well as functions of providing venue maps and sampling routes to sampling devices. Location manager 830 can include instructions for causing processor 802 to perform functions of location calculation unit 614. Fingerprint manager 840 can include instructions for causing processor 802 to perform functions of fingerprint engine 626. Operating system 814 can be multi-user, multiprocessing, multitasking, multithreading, real time, etc. Operating system 814 performs basic tasks, including but not limited to: recognizing input from and providing output to devices 806, 808; keeping track and managing files and directories on computer-readable mediums 812 (e.g., memory or a storage device); controlling peripheral devices; and managing traffic on the one or more communication channels 810. Network communications module 816 includes various components for establishing and maintaining network connections (e.g., software for implementing communication protocols, such as TCP/IP, HTTP, etc.).

Architecture 800 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

Exemplary Mobile Device Architecture

Figure 9:
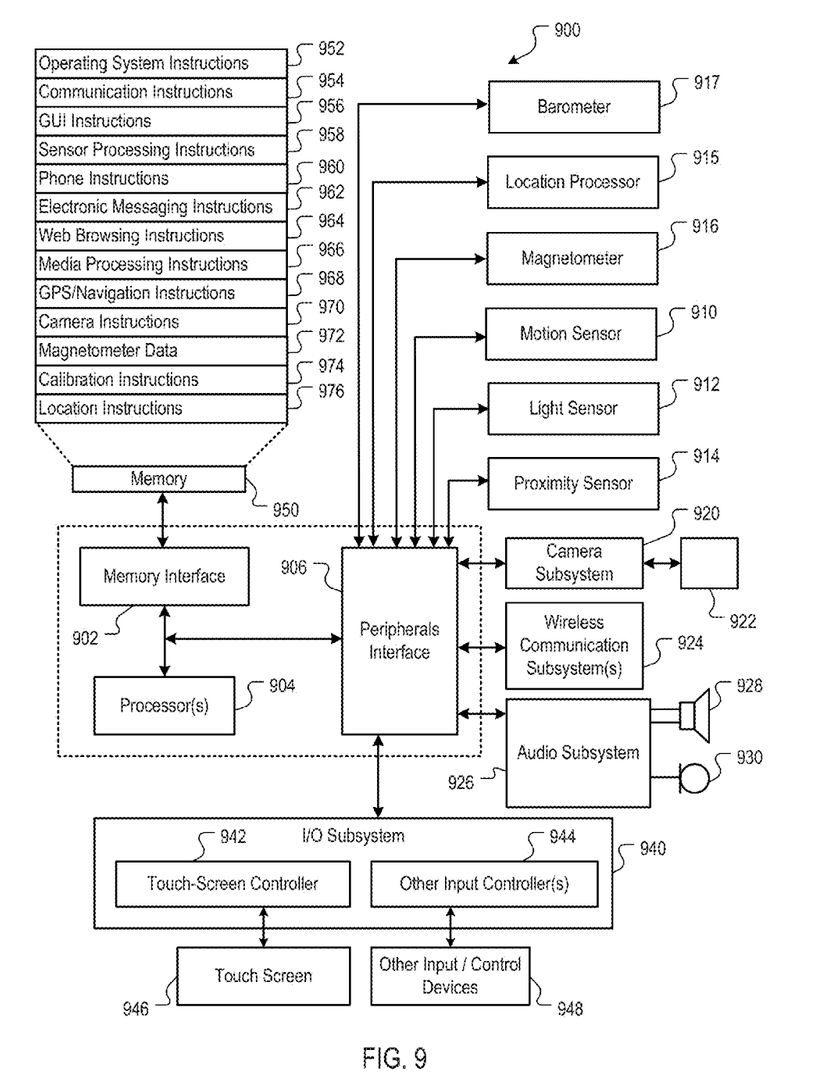
FIG. 9 is a block diagram illustrating an exemplary device architecture of a mobile device implementing the features and operations described in reference to FIGS. 1-7.

FIG. 9 is a block diagram of an exemplary architecture 900 for the mobile devices of FIGS. 1-7. A mobile device (e.g., mobile device 102) can include memory interface 902, one or more data processors, image processors and/or processors 904, and peripherals interface 906. Memory interface 902, one or more processors 904 and/or peripherals interface 906 can be separate components or can be integrated in one or more integrated circuits. Processors 904 can include application processors, baseband processors, and wireless processors. The various components in mobile device 102, for example, can be coupled by one or more communication buses or signal lines.

Sensors, devices, and subsystems can be coupled to peripherals interface 906 to facilitate multiple functionalities. For example, motion sensor 910, light sensor 912, and proximity sensor 914 can be coupled to peripherals interface 906 to facilitate orientation, lighting, and proximity functions of the mobile device. Location processor 915 (e.g., GPS receiver) can be connected to peripherals interface 906 to provide geopositioning. Electronic magnetometer 916 (e.g., an integrated circuit chip) can also be connected to peripherals interface 906 to provide data that can be used to determine the direction of magnetic North. Thus, electronic magnetometer 916 can be used as an electronic compass. Motion sensor 910 can include one or more accelerometers configured to determine change of speed and direction of movement of the mobile device. Barometer 917 can include one or more devices connected to peripherals interface 906 and configured to measure pressure of atmosphere around the mobile device.

Camera subsystem 920 and an optical sensor 922, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 924, which can include radio frequency receivers and transmitters and/or optical (e.g., infrared) receivers and transmitters. The specific design and implementation of the communication subsystem 924 can depend on the communication network(s) over which a mobile device is intended to operate. For example, a mobile device can include communication subsystems 924 designed to operate over a GSM network, a GPRS network, an EDGE network, a Wi-Fi™ or WiMax™ network, and a Bluetooth™ network. In particular, the wireless communication subsystems 924 can include hosting protocols such that the mobile device can be configured as a base station for other wireless devices.

Audio subsystem 926 can be coupled to a speaker 928 and a microphone 930 to facilitate voice-enabled functions, such as voice recognition, voice replication, digital recording, and telephony functions. Audio subsystem 926 can be configured to receive voice commands from the user.

I/O subsystem 940 can include touch surface controller 942 and/or other input controller(s) 944. Touch surface controller 942 can be coupled to a touch surface 946 or pad. Touch surface 946 and touch surface controller 942 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 946. Touch surface 946 can include, for example, a touch screen.

Other input controller(s) 944 can be coupled to other input/control devices 948, such as one or more buttons, rocker switches, thumb-wheel, infrared port, USB port, and/or a pointer device such as a stylus. The one or more buttons (not shown) can include an up/down button for volume control of speaker 928 and/or microphone 930.

In one implementation, a pressing of the button for a first duration may disengage a lock of the touch surface 946; and a pressing of the button for a second duration that is longer than the first duration may turn power to mobile device 102 on or off. The user may be able to customize a functionality of one or more of the buttons. The touch surface 946 can, for example, also be used to implement virtual or soft buttons and/or a keyboard.

In some implementations, mobile device 102 can present recorded audio and/or video files, such as MP3, AAC, and MPEG files. In some implementations, mobile device 102 can include the functionality of an MP3 player. Mobile device 102 may, therefore, include a pin connector that is compatible with the iPod. Other input/output and control devices can also be used.

Memory interface 902 can be coupled to memory 950. Memory 950 can include high-speed random access memory and/or non-volatile memory, such as one or more magnetic disk storage devices, one or more optical storage devices, and/or flash memory (e.g., NAND, NOR). Memory 950 can store operating system 952, such as Darwin, RTXC, LINUX, UNIX, OS X, WINDOWS, or an embedded operating system such as VxWorks. Operating system 952 may include instructions for handling basic system services and for performing hardware dependent tasks. In some implementations, operating system 952 can include a kernel (e.g., UNIX kernel).

Memory 950 may also store communication instructions 954 to facilitate communicating with one or more additional devices, one or more computers and/or one or more servers. Memory 950 may include graphical user interface instructions 956 to facilitate graphic user interface processing; sensor processing instructions 958 to facilitate sensor-related processing and functions; phone instructions 960 to facilitate phone-related processes and functions; electronic messaging instructions 962 to facilitate electronic-messaging related processes and functions; web browsing instructions 964 to facilitate web browsing-related processes and functions; media processing instructions 966 to facilitate media processing-related processes and functions; GPS/Navigation instructions 968 to facilitate GPS and navigation-related processes and instructions; camera instructions 970 to facilitate camera-related processes and functions; magnetometer data 972 and calibration instructions 974 to facilitate magnetometer calibration. The memory 950 may also store other software instructions (not shown), such as security instructions, web video instructions to facilitate web video-related processes and functions, and/or web shopping instructions to facilitate web shopping-related processes and functions. In some implementations, the media processing instructions 966 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 950. Memory 950 can store location instructions 976 that, when executed, can cause processor 904 to perform operations of requesting tiered delivery of location data from location server 112, determining a coarse location based on coarse location data received from location server 112, and determining a detailed location based on the detailed location data received from location server 112.

Each of the above identified instructions and applications can correspond to a set of instructions for performing one or more functions described above. These instructions need not be implemented as separate software programs, procedures, or modules. Memory 950 can include additional instructions or fewer instructions. Furthermore, various functions of the mobile device may be implemented in hardware and/or in software, including in one or more signal processing and/or application specific integrated circuits.

Exemplary Operating Environment

Figure 10:
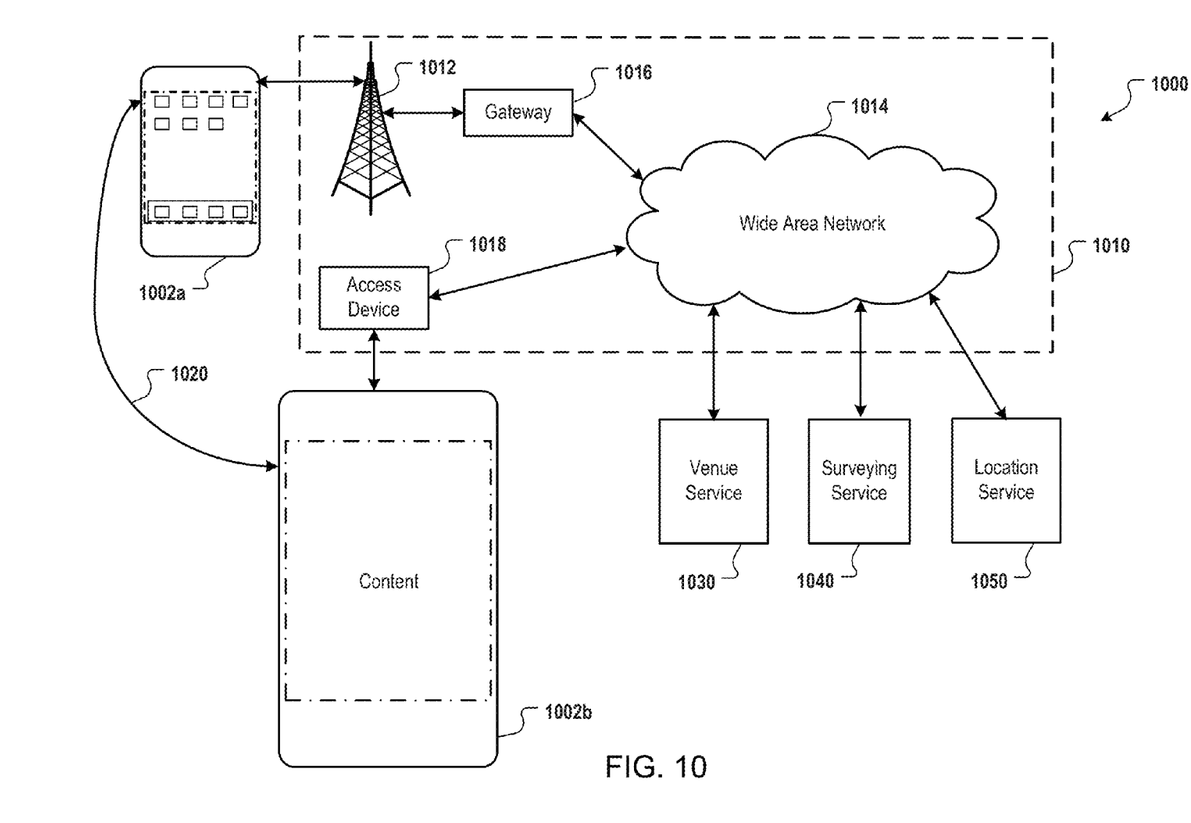
FIG. 10 is a block diagram of an exemplary network operating environment for the mobile devices of FIGS. 1-7.

FIG. 10 is a block diagram of an exemplary network operating environment 1000 for the mobile devices of FIGS. 1-7. Mobile devices 1002a and 1002b can, for example, communicate over one or more wired and/or wireless networks 1010 in data communication. For example, a wireless network 1012, e.g., a cellular network, can communicate with a wide area network (WAN) 1014, such as the Internet, by use of a gateway 1016. Likewise, an access device 1018, such as an 802.11g wireless access point, can provide communication access to the wide area network 1014. Each of mobile devices 1002a and 1002b can be mobile device 102 configured to survey a venue, or another mobile device requesting location services.

In some implementations, both voice and data communications can be established over wireless network 1012 and the access device 1018. For example, mobile device 1002a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 1012, gateway 1016, and wide area network 1014 (e.g., using Transmission Control Protocol/Internet Protocol (TCP/IP) or User Datagram Protocol (UDP)). Likewise, in some implementations, the mobile device 1002b can place and receive phone calls, send and receive e-mail messages, and retrieve electronic documents over the access device 1018 and the wide area network 1014. In some implementations, mobile device 1002a or 1002b can be physically connected to the access device 1018 using one or more cables and the access device 1018 can be a personal computer. In this configuration, mobile device 1002a or 1002b can be referred to as a "tethered" device.

Mobile devices 1002a and 1002b can also establish communications by other means. For example, wireless device 1002a can communicate with other wireless devices, e.g., other mobile devices, cell phones, etc., over the wireless network 1012. Likewise, mobile devices 1002a and 1002b can establish peer-to-peer communications 1020, e.g., a personal area network, by use of one or more communication subsystems, such as the Bluetooth™ communication devices. Other communication protocols and topologies can also be implemented.

The mobile device 1002a or 1002b can, for example, communicate with one or more services 1030, 1040, and 1050 over the one or more wired and/or wireless networks. For example, one or more venue services 1030 can provide coarse location data to mobile devices 1002a and 1002b. The coarse location data can include venue identifiers associated with venue maps. Survey service 1040 can receive survey data from mobile devices 1002a and 1002b, and generating coarse location data and detailed location data for venues based on the survey data. Location service 1050 can provide the generating coarse location data and detailed location data to mobile devices 1002a and 1002b for determining locations at each venue.

Mobile device 1002a or 1002b can also access other data and content over the one or more wired and/or wireless networks. For example, content publishers, such as news sites, Really Simple Syndication (RSS) feeds, web sites, blogs, social networking sites, developer networks, etc., can be accessed by mobile device 1002a or 1002b. Such access can be provided by invocation of a web browsing function or application (e.g., a browser) in response to a user touching, for example, a Web object.

A number of implementations of the invention have been described. Nevertheless, it will be understood that various modifications can be made without departing from the spirit and scope of the invention.

What is claimed is:

1. A method comprising:
    determining that a location of a mobile device is within a threshold distance from a venue cluster, the venue cluster comprising one or more venues, each venue comprising a space accessible by a pedestrian and one or more constraints of movement of the pedestrian in the space;
    providing, to the mobile device, coarse location data for each venue in the venue cluster, the coarse location data comprising:
        a venue identifier of a corresponding venue and a venue bounding box of the corresponding venue, the venue bounding box representing space occupied by the venue;
        a group of one or more coarse tiles of the corresponding venue, each coarse tile comprising a coarse tile identifier and a tile bounding box, the tile bounding box representing space occupied by the corresponding coarse tile at the venue; and
        parameters of a probability distribution function for determining a location of the mobile device at the venue based on measurements of signals from one or more signal sources;
    receiving, from the mobile device:
        an indication that a contextual condition for downloading location fingerprint data has been satisfied, and one of the coarse tile identifiers; and
    based on the contextual condition, providing detailed location data corresponding to the coarse tile to the mobile device for determining a location of the mobile device in at least one of the one or more venues,
    wherein the method is performed by one or more computers.

2. The method of claim 1, wherein the venue bounding box and each coarse tile bounding box is a three-dimensional box.

3. The method of claim 1, wherein each of the one or more signal sources includes a radio frequency (RF) signal transmitter.

4. The method of claim 1, wherein the contextual condition comprises at least one of:
    a movement velocity of the mobile device satisfies a pedestrian walking speed threshold; or
    an estimated location of the mobile device is in the venue bounding box.

5. The method of claim 1, wherein the detailed location data comprise location fingerprints of the corresponding venue, the location fingerprints comprising:
    expected measurements of signals at multiple locations of the venue; and
    variance of the expected measurements, wherein the location fingerprints are usable by the mobile device to determine a venue location of the mobile device at the corresponding venue, the venue location being a location relative to the venue.

6. The method of claim 1, wherein the identifier received from the mobile device is determined from the one or more coarse tile identifiers based on a probability that the mobile device is located in the tile bounding box of the corresponding coarse tile.

7. The method of claim 1, comprising:
    determining, based on the location of the mobile device, that the mobile device will enter a venue in which data communications are subject to interference; and
    upon the determining, providing detailed location data corresponding to the venue to the mobile device.

8. A non-transitory storage device storing instructions operable to cause one or more processors to perform operations comprising:
    determining that a location of a mobile device is within a threshold distance from a venue cluster, the venue cluster comprising one or more venues, each venue comprising a space accessible by a pedestrian and one or more constraints of movement of the pedestrian in the space;
    providing, to the mobile device, coarse location data for each venue in the venue cluster, the coarse location data comprising:
        a venue identifier of a corresponding venue and a venue bounding box of the corresponding venue, the venue bounding box representing space occupied by the venue;
        a group of one or more coarse tiles of the corresponding venue, each coarse tile comprising a coarse tile identifier and a tile bounding box, the tile bounding box representing space occupied by the corresponding coarse tile at the venue; and
        parameters of a probability distribution function for determining a location of the mobile device at the venue based on measurements of signals from one or more signal sources;
    receiving, from the mobile device:
        an indication that a contextual condition for downloading location fingerprint data has been satisfied, and
        a coarse tile identifier, the coarse tile identifier being determined from the one or more coarse tile identifiers based on a probability that the mobile device is located in the tile bounding box of the corresponding coarse tile; and based on the contextual condition, providing detailed location data corresponding to the coarse tile to the mobile device for determining a location of the mobile device in at least one of the one or more venues.

9. The non-transitory storage device of claim 8, wherein the venue bounding box and each coarse tile bounding box is a three-dimensional box.

10. The non-transitory storage device of claim 8, wherein each of the one or more signal sources includes a radio frequency (RF) signal transmitter.

11. The non-transitory storage device of claim 8, wherein the contextual condition comprises at least one of:
a movement velocity of the mobile device satisfies a pedestrian walking speed threshold; or
an estimated location of the mobile device is in the venue bounding box.

12. The non-transitory storage device of claim 8, wherein the detailed location data comprise location fingerprints of the corresponding venue, the location fingerprints comprising:
expected measurements of signals at multiple locations of the venue; and
variance of the expected measurements, wherein the location fingerprints are usable by the mobile device to determine a venue location of the mobile device at the corresponding venue, the venue location being a location relative to the venue.

13. The non-transitory storage device of claim 8, wherein the identifier received from the mobile device is determined from the one or more coarse tile identifiers based on a probability that the mobile device is located in the tile bounding box of the corresponding coarse tile.

14. The non-transitory storage device of claim 8, the operations comprising:
determining, based on the location of the mobile device, that the mobile device will enter a venue in which data communications are subject to interference; and
upon the determining, providing detailed location data corresponding to the venue to the mobile device.

15. A system comprising:
one or more processors; and
a storage device storing instructions operable to cause the one or more processors to perform operations comprising:
determining that a location of a mobile device is within a threshold distance from a venue cluster, the venue cluster comprising one or more venues, each venue comprising a space accessible by a pedestrian and one or more constraints of movement of the pedestrian in the space;
providing, to the mobile device, coarse location data for each venue in the venue cluster, the coarse location data comprising:
a venue identifier of a corresponding venue and a venue bounding box of the corresponding venue, the venue bounding box representing space occupied by the venue;
a group of one or more coarse tiles of the corresponding venue, each coarse tile comprising a coarse tile identifier and a tile bounding box, the tile bounding box representing space occupied by the corresponding coarse tile at the venue; and
parameters of a probability distribution function for determining a location of the mobile device at the venue based on measurements of signals from one or more signal sources;
receiving, from the mobile device:
an indication that a contextual condition for downloading location fingerprint data has been satisfied, and
a coarse tile identifier, the coarse tile identifier being determined from the one or more coarse tile identifiers based on a probability that the mobile device is located in the tile bounding box of the corresponding coarse tile; and
based on the contextual condition, providing detailed location data corresponding to the coarse tile to the mobile device for determining a location of the mobile device in at least one of the one or more venues.

16. The system of claim 15, wherein the venue bounding box and each coarse tile bounding box is a three-dimensional box.

17. The system of claim 15, wherein each of the one or more signal sources includes a radio frequency (RF) signal transmitter.

18. The system of claim 15, wherein the contextual condition comprises at least one of:
a movement velocity of the mobile device satisfies a pedestrian walking speed threshold; or
an estimated location of the mobile device is in the venue bounding box.

19. The system of claim 15, wherein the detailed location data comprise location fingerprints of the corresponding venue, the location fingerprints comprising:
expected measurements of signals at multiple locations of the venue; and
variance of the expected measurements, wherein the location fingerprints are usable by the mobile device to determine a venue location of the mobile device at the corresponding venue, the venue location being a location relative to the venue.

20. The system of claim 15, wherein the identifier received from the mobile device is determined from the one or more coarse tile identifiers based on a probability that the mobile device is located in the tile bounding box of the corresponding coarse tile.

21. The system of claim 15, the operations comprising:
determining, based on the location of the mobile device, that the mobile device will enter a venue in which data communications are subject to interference; and
upon the determining, providing detailed location data corresponding to the venue to the mobile device.

* * * * *